Oct. 3, 1933.  J. G. CLARK ET AL  1,928,992
FLEXIBLE TUBING
Filed Feb. 20, 1931
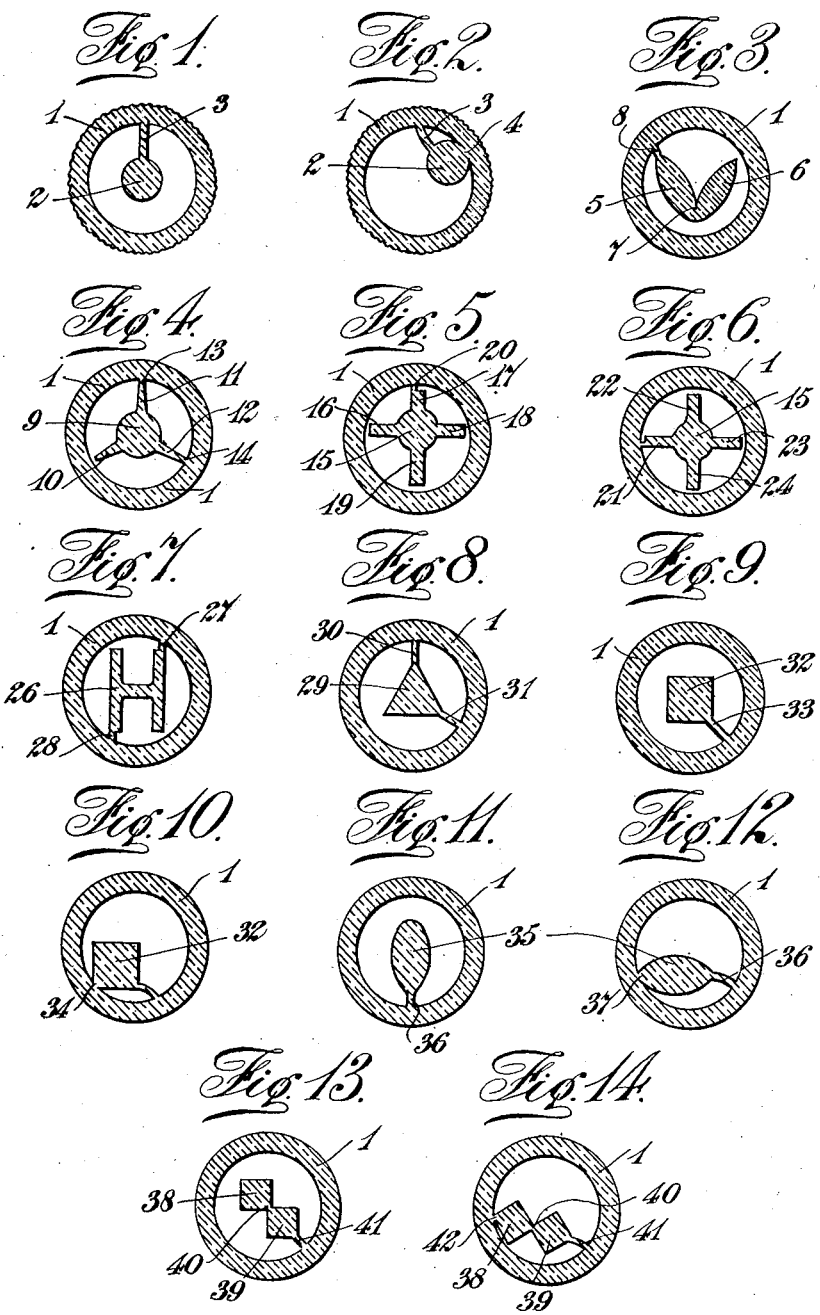
INVENTORS
J. G. CLARK
C. A. MASTERMAN
BY _____ ATTORNEY Patented Oct. 3, 1933

1,928,992

UNITED STATES PATENT OFFICE 1,928,992

FLEXIBLE TUBING

Joseph George Clark and Cyril Aubyn Masterman, Westminster, England

Application February 20, 1931, Serial No. 517,355, and in Great Britain March 3, 1930

6 Claims. (Cl. 137—90)

This invention relates to flexible tubing and has for its object to provide an improved form of flexible tube of rubber, insertion and like material which even when kinked, bent, trod on or otherwise maltreated will still permit of the passage of a fluid therethrough. The invention is hereinafter described with reference to rubber tubing more particularly intended for use with gas appliances but it should be clearly understood that flexible tubing whether of rubber, insertion or the like in accordance with the present invention is not limited to such use.

According to the present invention a flexible tube which may be made by extrusion or otherwise is provided with one or more than one internal solid or hollow portion interconnected with the tube wall in such manner as to permit of the passage of a gas or liquid therethrough even if the tube be kinked, bent, trod on or otherwise maltreated. For instance the tube which may be plain or corrugated on its outer surface may be made with two solid internal ribs projections or members extending lengthwise through the tube one internal rib or projecting portion being free or unconnected with the tube itself and the other internal rib or projecting member being lightly attached to the tube during the course of the manufacture of the latter. Where three solid internally disposed ribs are provided inside the tube two of these internal ribs are preferably unconnected with the tube itself whereas the third internal rib is lightly connected to the tube so that the joint of the rib with the tube can be readily quickly and easily severed. In an alternative form of tube the interior of the latter may be provided with a cylindrical, oval, polygonal, square or other nonrectangular piece extending lengthwise through the tube and united with the tube by a thin flat severable web. Obviously the section of the internal solid member or solid portion in the interior of the tube may be of any suitable form provided a passage is left for the flow of a fluid through the tube when the latter is kinked, bent, trod on or otherwise maltreated. For instance another suitable form of solid member in the interior of the tube would be of cruciform cross section extending lengthwise through the interior of the whole of the tube one or more than one edge of the said cruciform member in cross section being unconnected with the tube body.

In order that the invention may be clearly understood and readily carried into effect reference is made to the accompanying drawing which shows diagrammatically and by way of example constructions of flexible tubing in accordance with the present invention.

Figures 1 to 14 show cross sections of various constructions of flexible tubing which may be of rubber, insertion and the like in accordance with the present invention.

Referring to Figure 1 a flexible tube 1 of rubber, insertion or the like is made with a hollow or solid internal portion 2 connected to the wall of the tube by a thin web 3.

In Figure 2 the solid portion 2 is connected at two places to the flexible tube wall one connection being by the thin web 3 and the other being indicated at 4. In Figure 3 solid portions 5, 6 are provided which are of lenticular form. These two portions 5, 6 are connected together as at 7 and the portion 5 is connected by a thin web 8 to the wall of the flexible tube 1. In Figure 4 the flexible tube is shown as being provided with a solid portion 9 having three ribs 10, 11, 12. Any one of these ribs 10, 11, 12 say the rib 11 may be connected to the flexible tube 1 by a thin web 13. If desired the ribs 10 and 12 may also be connected to the flexible tube of one of these say the rib 12 may be connected to the flexible tube by a thin web 14 which is so thin that it can be readily slit a suitable length inwardly of the flexible tube and before the said tube is used. It should be clearly understood that the connection or connections of the solid internal portions hereinbefore and hereinafter described are so thin that they can be slit for a suitable length along the flexible tube so as to permit of the attachment of the said tube to any desired object. Figure 5 shows a flexible tube having an interior portion of cruciform shape comprising a central solid portion 15 and four arms 16, 17, 18 and 19 all of which are interconnected with the central solid portion 15. One arm say 17 of the arms may be connected to the flexible tube 1 by a thin web 20 and any one or more than one arm of the remaining arms may be connected by a web to the said tube. Figure 6 shows a modified form of the flexible tube shown in Figure 5, 15 being a central solid portion and 21, 22, 23 and 24 arms projecting therefrom to the wall of the said tube. Any one or more than one arm of the arms 21, 22, 23, 24 may be connected by a thin web to the wall of the flexible tube. As shown however the arm 21 is connected to the flexible tube wall. Further any two, three or all of the arms may be connected by thin webs to the flexible tube. Figure 7 shows a cross section of a flexible tube having a solid internal portion 26 somewhat in the form of an alphabetical letter H which is connected at least at one place 27 to the flexible tube 1. The solid interior portion 26 may also be connected to the tube 1 as at 28, or any other part or parts of the internal portion 26 may be connected by a thin web or webs to the tube wall. Figure 8 shows a cross section of a flexible tube 1 having an internal solid triangular portion 29 which may be connected to the flexible tube by a web 30. If desired the triangular portion 29 may also be connected with the flexible tube as at 31. In Figures 9 and 10 the solid portion is shown as of cubical form at 32 extending the length of the flexible tube and interconnected with the wall thereof by a web as at 33. If desired the cubical portion 32 may also be connected to the flexible tube as at 34 as shown in Figure 10. In Figure 11 a flexible tube 1 is shown having an internal solid portion 35 of oval form interconnected with the tube by a thin web as at 36. In Figure 12 the solid oval portion of Figure 11 is shown as being connected by a further thin web 37 to the flexible tube 1. In Figures 13 and 14 a flexible tube is shown as having two solid internal portions 38, 39 interconnected together as at 40 and the part 39 being connected by a thin web 41 to the wall of the tube. In Figure 14 the parts 38 and 39 are further connected to the wall of the flexible tube by a thin web 42.

Rubber insertion and like tubes of the form hereinbefore described and after slitting the web or webs for a suitable length permit of the attachment to the said tubes of a nozzle, socket, plug, tube, gas tap or any other suitable device or coupling of ordinary form by bending the wall of the flexible tube backwards for half an inch, an inch or any other suitable distance and slitting the exposed portion of the solid internal member at the junction or junctions of the latter with the tube body and thereafter restoring the flexible tube and to its ordinary condition. A flexible, insertion or like tube formed as hereinbefore described will not even when kinked, bent, trod on or otherwise maltreated stop the flow of a fluid such as gas therethrough. For example sufficient gas will then flow through the tube to maintain at least a pilot gas jet alight. It should be clearly understood however that the internal solid or if desired hollow member or members or ribs may be of any cross section such as will allow gas or liquid to flow therethrough even when the tube is bent, kinked, trod on or otherwise maltreated.

What we claim is:—

1. In a flexible tube arranged for the transmission of fluids, a member extending longitudinally of the interior of the tube and a relatively thin web connecting the member with the tube, and serving to prevent the closing of a throughway passage for the fluid in the tube in the event of bending or kinking of the tube to an extent to otherwise close the interior bore thereof.

2. A construction in accordance with claim 1, wherein the member is of substantially circular form in cross section.

3. A construction as defined in claim 1, wherein the member is substantially of cruciform shape in cross section.

4. A construction as defined in claim 1, wherein the member is of substantially triangular shape in cross section.

5. A construction as defined in claim 1, wherein the member is of substantially triangular shape in cross section and wherein said member is connected with the tube by two relatively thin webs.

6. A construction as defined in claim 1, wherein the member is of substantially triangular shape in cross section and wherein said member is connected to the tube by two relatively thin webs extending from opposite edges of one face of the member.

JOSEPH GEORGE CLARK.
CYRIL AUBYN MASTERMAN.